UNITED STATES PATENT OFFICE.

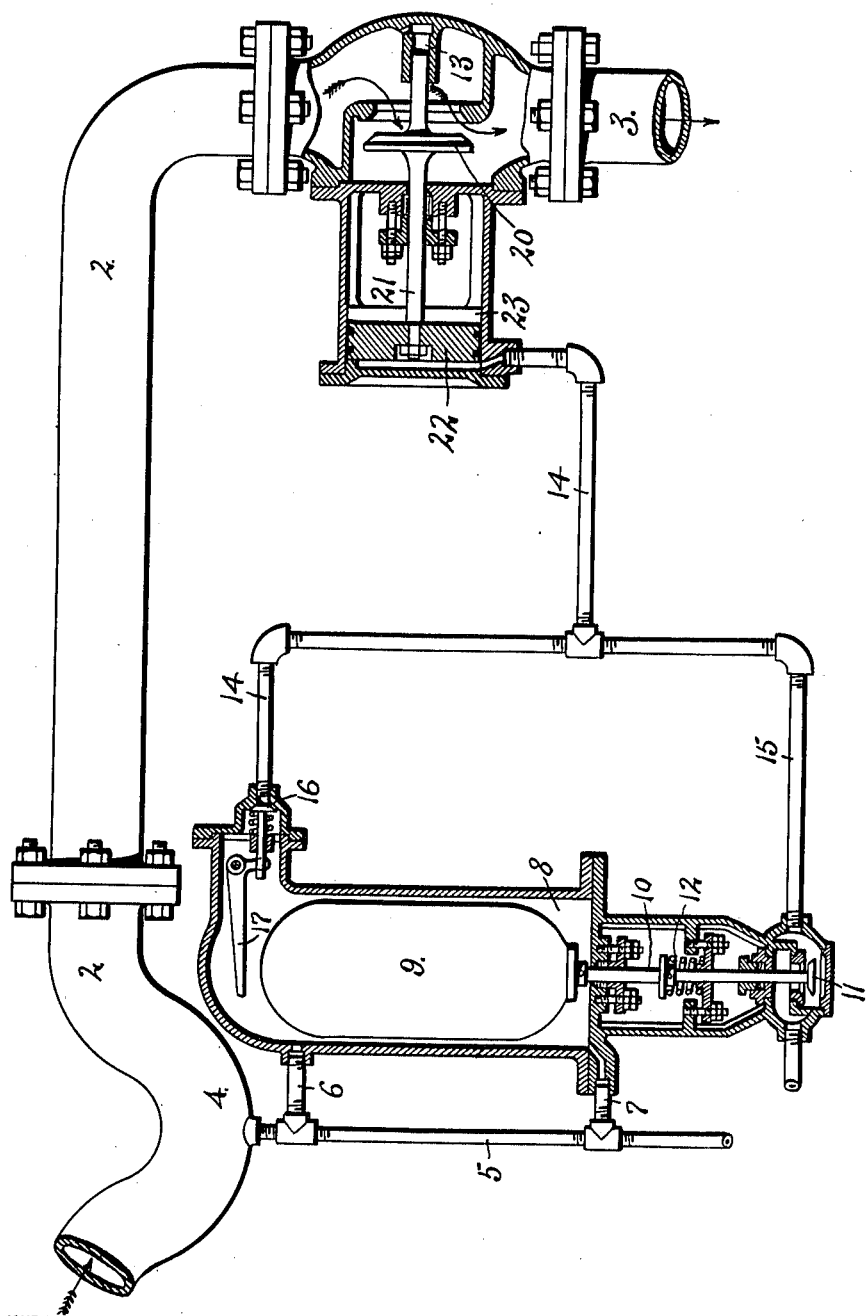

JOSEPH A. H. PROVOST, OF VAN ANDA, TEXADA ISLAND, BRITISH COLUMBIA, CANADA.

PRIMING CHECK-VALVE.

969,902.　　　　　Specification of Letters Patent.　　Patented Sept. 13, 1910.

Application filed November 15, 1909. Serial No. 528,061.

*To all whom it may concern:*

Be it known that I, JOSEPH A. H. PROVOST, citizen of the Dominion of Canada, residing at Van Anda, Texada Island, in the Province of British Columbia, Canada, have invented new and useful Priming Check-Valves, of which the following is a specification.

This invention relates to a means for arresting the flow of steam in a steam-pipe from a boiler to an engine in order that any water carried in it by priming from the boiler may deposit in the pipe and not be carried to the engine.

Separators and traps of various kinds are common to prevent water being carried into the cylinders of an engine, but in all such with which I am acquainted no attempt has been made to automatically check the flow of steam, which is the instinctive action of an engineer under such circumstances as it permits the suspended water to fall and stops priming by lessening the withdrawal from the boiler.

With this object in view I provide a means, operative by the presence of water in the steam-pipe, that will close a check valve in that steam-pipe and thereby arrest the flow of steam, permitting any water that may be held in suspension to fall into the bottom of the pipe and be drained away to the hot well for return to the boiler.

The invention is particularly described in the following specification, reference being made to the drawing by which it is accompanied, in which:

The figure represents in vertical section my device in its application to a steam-pipe.

In these drawings 2 represents a section of steam-pipe adjacent to the engine to which it is delivering at 3 the arrows indicating the direction of the flow of steam. In this steam-pipe 2 is a downward bend 4 in which any water will drain and from the lower part of this bend 4 a pipe 5 drains the collected water through a steam trap to the hot well.

The pipe 5 is connected at 6 and 7 to the upper and lower end of an elongated float chamber 8 in which a float 9 is vertically movable. This float 9 normally rests on the upper end of a stem 10 slidable in a gland through the bottom of the float chamber and connected therebeneath to a valve 11 controlling the passage through a pipe 15 the object of which will be explained later. A spring 12 holds this valve 11 closed when the weight of the float 9 is lifted off it, but this spring will be overcome to open the valve when the float is in the normal position as shown in the drawing.

Situated in the steam-pipe 2 between the water drain pipe 5 and the engine and adjacent to the latter is a check valve 20 opening toward the engine and the stem 21 of this valve passes through a gland and outside the gland has secured to it a piston 22 endwise movable in a cylinder 23 the piston being at the closed end of the cylinder when the check valve is open.

The closed end of the cylinder 23 is connected by a pipe 14 to the upper end of the float chamber 8 and by a pipe 15 to the valve 11 controlled by the float stem 10 which pipe 15 thereafter delivers through a trap to the hot well.

The passage through the pipe 14 from the upper end of the float chamber 8 to the closed end of the cylinder 23 is controlled by a valve 16 normally held in the closed position by a light spring but opened against the resistance of the spring by a pivotally mounted bell crank lever 17 one arm of which projects over the float 9 to be engaged by it when it is lifted toward the upper limit of its movement.

In use the position of the various parts of the device are normal as represented in the drawing, the bend 4 of the steam pipe draining the water of condensation, which is conducted by the pipe 5 to the hot well or trap from which it will be returned to the boiler, and the steam passing to the engine through the valve 20 as indicated by the arrows.

When any considerable amount of water is lifted by priming and is being carried with the steam, some of it is thrown down at the bend 4 and if in excess of what the drain pipe 5 is designed to carry away it will collect within the float chamber 8 and will lift the float 9 off the stem 10 of the valve 11, permitting the spring 12 to close that valve. As the float 9 approaches the upper limit of its movement it will engage the extended arm of the bell crank 17 and will thereby open the valve 16 and will permit the steam to pass from the upper end of the float chamber 8, through the pipe 14, to the closed end of the cylinder 23 where it will act upon the piston 22 to close the check valve 20 against the pressure of the steam. This stoppage of the flow of the steam will allow the water carried in suspension in it to fall and be drained away to the hot well.

So soon as the level of the water in the chamber 8 is lowered the float 9 will first fall from engagement of the lever 17 and the valve 16 will close and cut off steam from the cylinder 23. Further fall of the float will bring it to rest upon the upper end of the valve stem 10 when its weight will overcome the resistance of the spring 12 and open the valve 11 permitting the steam in the cylinder 23 to exhaust through the pipe 14. The steam pressure being released from the cylinder 23 the check valve 20 will open and steam service to the engine will be resumed.

The end of the stem of the check valve 20 may fit in a guide 13 having a closed end from which there is a restricted outlet, so that the movement of the valve in closing on its seat will be checked.

Although the valve has been designed with the object of preventing water, lifted by priming from the boiler, from being delivered to the engine cylinders, I anticipate that it will have the effect of preventing priming, as it may not act intermittently as necessarily described in the specification, but will regulate the flow of steam to the engine in a manner that will prevent priming in the boiler.

Having now particularly described my invention and the manner of its operation and use, I hereby declare that what I claim as new and desire to be protected in by Letters Patent, is:

1. As an anti-priming device, the combination with a check valve adapted to be seated against the flow of steam to the engine, of means for closing that valve said means being operative by an excess of water in the steam pipe.

2. In a device of the class described, a check valve in a steam pipe said valve adapted to be seated against the flow of steam to the engine, a chamber connected to the under side of the steam pipe on the boiler side of the check valve, a float in that chamber, and means whereby the movement of the float will admit steam to close the check valve.

3. In a device of the class described, the combination with a check valve in a steam pipe adjacent to the engine said valve being seated against the flow of steam, means for draining the water from the under side of the steam pipe adjacent to the engine, a chamber into which any surplus drain water is free to flow, a float in said chamber, a passage connecting the upper end of the float chamber to a cylinder the piston of which closes the check valve, means for closing said passage when the float is at the upper limit of its movement, an exhaust pipe from the cylinder in which is a valve which is held open by the float when at the lower limit of its movement, and a means for closing said valve when the float is lifted off its stem.

4. In a device of the class described, the combination with a check valve situated in a steam pipe adjacent to an engine and seated against the flow of steam, a piston endwise movable in a cylinder and controlling the movement of said check valve, means for draining water from the steam pipe, means for connecting this drain pipe to a chamber that will receive any excess over what the drain pipe can carry away, a float endwise movable in said chamber which float normally holds open a valve controlling the exhaust from the cylinder the piston of which controls the steam pipe check valve, means for connecting the upper end of the float chamber to the steam pipe, means for connecting the upper end of the float chamber to the cylinder the piston of which controls the check valve, and means for closing this connecting pipe when the float rises to the upper limit of its movement.

5. In a device of the class described, the combination with a steam pipe that delivers steam from a boiler to an engine, a check valve located in said steam pipe adjacent to the engine and adapted to seat against the flow of steam, a cylinder, a piston endwise movable in said cylinder for controlling the closing movement of said check valve, said steam pipe including a trap bend, a drain pipe for draining water from said bend, a chamber, means for connecting said drain pipe with said chamber whereby said chamber will receive any excess over what said drain pipe can carry away, a float movable in said chamber, a valve normally held open by said float for controlling the exhaust from the cylinder the piston of which controls the steam pipe check valve, means for connecting the upper end of the float chamber with the steam pipe, means for connecting the upper end of the float chamber to the cylinder the piston of which controls the check valve, means for closing this connecting means when the float rises to the upper limit of its movement, substantially as shown and described.

In testimony whereof I have signed my name to this specification in the presence of two subscribing witnesses.

JOSEPH A. H. PROVOST.

Witnesses:
ROWLAND BRITTAIN,
ALEXANDER SMITH.